US006210510B1

(12) United States Patent
Kern, Jr. et al.

(10) Patent No.: US 6,210,510 B1
(45) Date of Patent: Apr. 3, 2001

(54) POLYMER PROTECTED COMPONENT

(75) Inventors: Frederick William Kern, Jr., Colchester; Donald Joseph Martin, Fairfield, both of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,607

(22) Filed: Nov. 12, 1999

Related U.S. Application Data

(62) Division of application No. 09/090,559, filed on Jun. 4, 1998, now Pat. No. 5,996,601, which is a division of application No. 08/673,659, filed on Jun. 28, 1996, now Pat. No. 5,868,882.

(51) Int. Cl.[7] .................................. B08B 3/12; B32B 1/02

(52) U.S. Cl. ......................... 156/160; 156/307.7; 134/184; 134/902

(58) Field of Search .............................. 156/85, 160, 163, 156/165, 229, 307.7, 494, 580.1, 379.6, 73.1; 427/398.1; 134/184, 1.3, 902

(56) References Cited

U.S. PATENT DOCUMENTS 5,383,484 * 1/1995 Thomas et al. ...................... 134/184

* cited by examiner

*Primary Examiner*—Sam Chuan Yao
(74) *Attorney, Agent, or Firm*—Robert A. Walsh

(57) ABSTRACT

The present invention is a method and apparatus for mechanically bonding a polymer to a convex surface of a substrate to provide intimate contact therebetween for improved energy transport between a transducer on one side of the substrate and a chemical bath on the other. The polymer seals the surface of the substrate from the chemical bath and may have a low adhesion to the substrate. A thin film of the polymer is brought under a tensile stress to provide intimate physical contact with most of the area of the convex surface. In one embodiment, the tensile stress is achieved by providing polymer as a liquid on the convex surface and then cooling to take advantage of differential thermal contraction between the polymer and the substrate to achieve the tensile stress in the polymer.

8 Claims, 3 Drawing Sheets

POLYMER PROTECTED COMPONENT

This application is a divisional of application Ser. No. 09/090,559 filed Jun. 4, 1998, now U.S. Pat. No. 5,996,601, which is a divisional of application Ser. No. 08/673,659 filed Jun. 28, 1996, now U.S. Pat. No. 5,868,882.

FIELD OF THE INVENTION

This invention generally relates to polymer protection for an energy source or sensor in a chemical bath. More particularly, the invention relates to a structure that provides a high level of protection and a high level of energy transmission. More particularly, the invention relates to an ultrasonic system having improved energy transfer without leakage.

BACKGROUND OF THE INVENTION

Sonic energy is used in semiconductor fabrication to enhance wet chemical processing. The efficient transfer of energy between energy source and liquid chemical bath is limited, however, where the transducer must be protected from aggressive chemicals. Significant energy losses occur at interfaces, particularly where there is an air gap.

Some prior art systems have had a sonic transducer bonded to a metallic plate which in turn is mounted to an outside wall of a chemically inert polymeric vessel. The transducer can be bonded firmly to the metal plate and the plate provides means for removing heat from the transducer, improving its reliability. But this structure has not been adequate to provide efficient delivery of sonic energy to the chemical bath where it is desired to form vessel walls from a flourocarbon polymer, such as teflon, for which there is no good adhesive between metal plate and polymer wall. The inability to provide intimate bonding at this interface has limited the use of such polymers for tank walls.

To counter this problem, other systems have sealed sonic transducers in a polymeric protective coating and placed them inside the processing vessel. However, this solution exposed the polymer coating, transducers and their electrical connections to the sometimes corrosive properties of the processing liquid. Polymer coating or seal failures have sometimes led to the contamination of semiconductor wafers in the chemical bath or to failure of the transducers or their mountings.

Because the thermal expansion coefficient of polymers is usually much larger than that of the transducers and substrates, where there is heating of the transducer or substrate, differential thermal expansion increases the gap between transducer or substrate and the coating, reducing the efficiency of energy transfer. This in turn increases the local temperature, exacerbating the problem and lowering transducer reliability. The thermal expansion not only degrades coupling of energy between transducer and processing fluid, it also can cause stress cracks and leaks through the polymer.

The air gap problem is best illustrated for an immersion heater type transducer that has a polymer coating. If an air gap develops between heater and coating the flow of heat out of the heater will be reduced, and so the temperature of the heater will increase. Portions of the polymer coating still contacting the heater will also get hotter. Since the polymer coating typically has a much larger thermal expansion coefficient than the heater, the polymer coating is likely to further expand away from the heater. In this case the heater will continue to increase in temperature, and ultimately the polymer will melt at the few points of contact.

A better solution is needed that provides a high level of coupling between transducers and their polymeric protective coats and a high level of transmission through the protective coats to the processing liquid chemical bath without introducing the risk of seal failures, and this solution is provided by the following invention.

SUMMARY OF THE INVENTION

It is therefore an object of the present invention to provide a structure that facilitates intimate contact between a low adhesive polymer, such as a fluoropolymer or a polyolefin, and a substrate.

It is a further object of the present invention to provide intimate contact between a a low adhesive polymer and a substrate as temperature vanes.

It is a further object of the present invention to provide intimate contact between a polymer and a substrate holding a component, such as a transducer, for efficiently transferring energy therebetween.

It is a further object of the present invention to provide efficient coated sonic transducers without gaps, seams, or seals for a chemical process vessel.

It is a feature of the present invention that differential thermal expansion is used to provide improved mechanical contact between a polymer coating and a substrate, providing a high level of mechanical coupling to low adhesion polymers, while retaining sufficient coupling as process temperature increases.

It is an advantage of the present invention that energy transfer efficiency and reliability is improved and system operating cost is reduced compared to present systems.

These and other objects, features, and advantages of the invention are accomplished by an apparatus for use in an external environment. The apparatus comprises a substrate having a convex surface having a component connected thereto. A layer of polymer extends across at least a portion of the convex surface. The polymer is under a tensile stress. The polymer is in physical contact with most of the portion of the convex surface as a result of the stress. The polymer seals the substrate from the external environment.

In one embodiment, the film of polymer stretched over the convex substrate is the wall of a chamber, the component is mounted on a side of the substrate opposite the convex surface, and the stretching of the polymer over the substrate is accomplished by differential thermal contraction during a cooling of the wall and substrate.

BRIEF DESCRIPTION OF THE DRAWINGS

The foregoing and other objects, features, and advantages of the invention will be apparent from the following detailed description of the invention, as illustrated in the accompanying drawings, in which.

DETAILED DESCRIPTION OF THE INVENTION

Figures 1A, 1B:
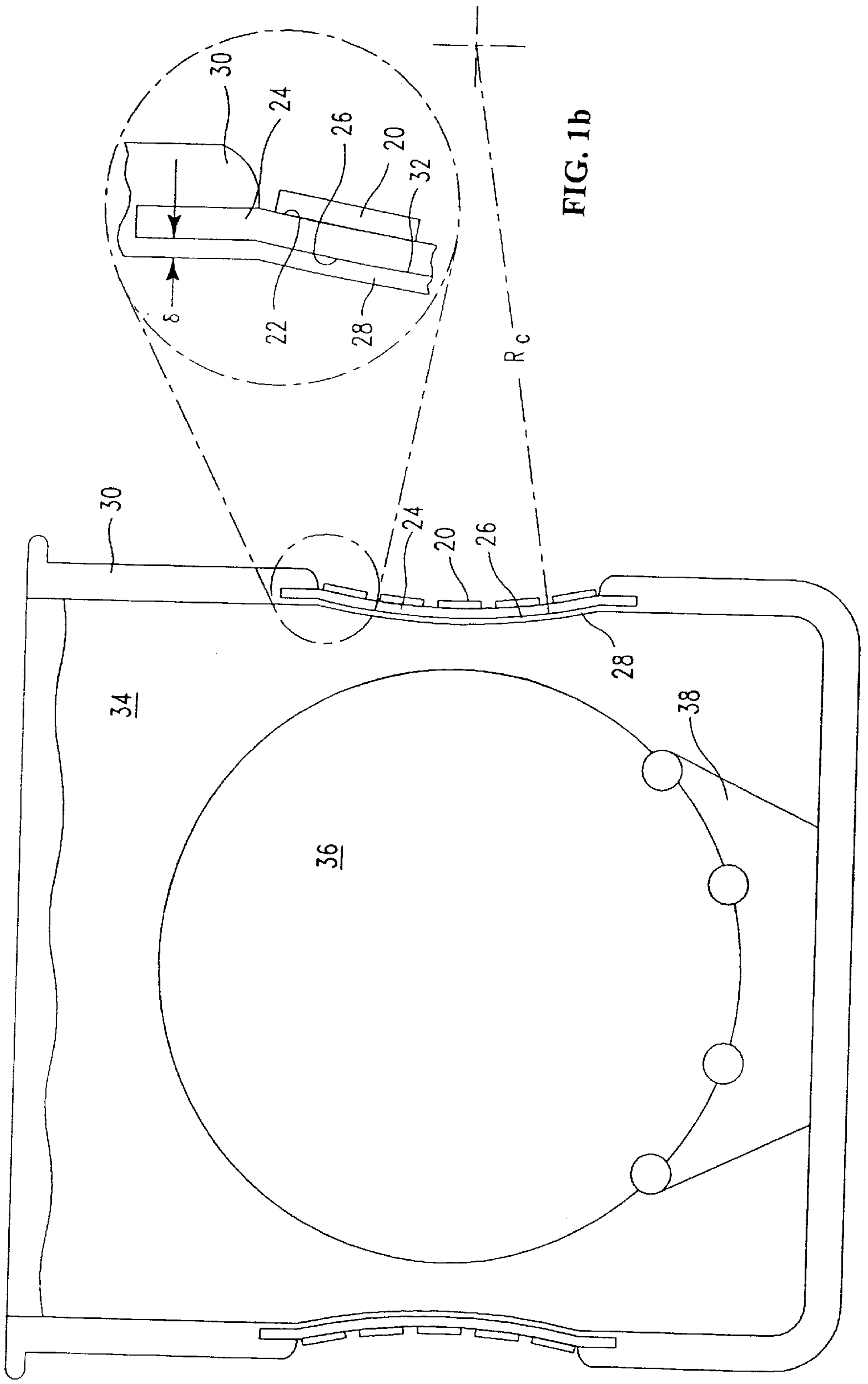
FIGS. 1a,1b are a cross sectional view of an ultrasonic process vessel having a thin wall region forced against a convex substrate with ultrasonic transducers mounted thereon, the force provided by differential thermal expansion coefficients.

The present invention provides an apparatus for efficiently transferring energy between a substrate and a low adhesion polymer, such as teflon. As shown in FIGS. 1*a*,1*b* transducer 20 is bonded to concave surface 22 of metallic substrate 24 which is opposite convex surface 26 of substrate 24. Convex surface 26 of substrate 22 faces thin polymer film 28 which forms part of polymer vessel 30. Thin polymer film 28 is stretched over convex surface 26 of substrate 24, the stretch ensuring a large area of intimate contact therebetween. Because thin polymer film 28 is in good physical contact with convex surface 26 of substrate 22 over most of the area of interface 32, energy is efficiently transmitted across interface 32. And the short path through thin polymer film 28 further permits efficient transmission of sonic energy from transducer 20 to bath 34 and then to semiconductor wafer 36 mounted on support 38 in vessel 30.

Since even a small air gap provides resistance to energy transfer, as used in this application, the term "intimate contact" means that most of the area of substrate-polymer interface 32 is in physical contact, without an air gap, or with a gap so small that energy transfer is not substantially degraded. Polymer sealing is needed for substrate 22 to contain bath 34, particularly if bath 34 is corrosive, and to avoid contamination of wafers. Thus, preferably, thin polymer film 28 is seamlessly connected with other portions of vessel 30.

Transducer 20 can be an energy source component or it can be an energy sensor component. It can supply or sense various kinds of energy, such as sonic energy or thermal energy. Or it can sense a wide variety of bath parameters, such as temperature, pressure, absorbance, and liquid level.

In one embodiment of the invention, the stretching of thin polymer film 28 over convex surface 26 of substrate 22 is accomplished by differential thermal contraction during cooling of vessel 30 and substrate 22 from the solidification point of the polymer. To fabricate the tank, substrate 22, having convex surface 26, and formed of a material, that has a higher melting point, a higher modulus of elasticity, and a higher compressive yield strength than the polymer is positioned in a mold (not shown) as an external backing plate for thin polymer film portion 28 of vessel 30. Substrate 22 can be formed of materials including metals, such as stainless steel or high carbon steel, ceramics, or glass. The substrate is usually a solid plate but it can have holes or glass windows to permit light penetration, for example.

In the next step, a liquid polymer, such as a thermoplastic resin, of which a wide range of materials are well known, is injected into the mold. Thus, both thin and thick walled portions of vessel 30 have a continuous polymer inner surface. It is also possible to weld thin film portion 28 into vessel 30. Preferably, thin walled portion 28 of vessel 30 is seamlessly connected with thick walled regions of vessel 30. The invention is especially useful for such thermoplastic resins as flouropolymers, such as Teflon PFA, and polyolefins that have low adhesion to other materials.

The mold and polymer are then cooled. When the solidification point of the polymer is reached (590° F. for Teflon PFA), the length and width dimensions of substrate 22 and thin polymer film 28 extending over convex surface 26 are fixed equal to each other. As polymer vessel 30 and substrate 22 cool from the solidification point, thin polymer film 28 contracts at a much faster rate than its curved metal backing, substrate 24. This causes a tensile strain to develop in thin polymer film 28 and this in turn imparts a tensile stress in thin polymer film 28 directed radially inward against convex surface 26 of substrate 24. The magnitude of this tensile stress increases proportionally as the temperature falls below the solidification temperature of polymer film 28. By virtue of the convex shape of the substrate, this stress provides a bonding force firmly holding polymer film 28 to convex surface 26 of the curved metal plate, substrate 24. In essence, thin polymer film 28 is stretched by thermal expansion force into intimate contact with convex surface 26 of substrate 24.

Because a polymer shrinks more than a metal, cooling a polymer over a convex metal surface from the polymer's solidification point provides a stretching of the polymer over the the metal. The stretching provides tight contact therebetween. While the stretching and contact force increase as the temperature decreases, it is clear that the polymer remains in tension at temperatures up to the melting point of the polymer. The invention thus takes advantage of thermal expansion to provide a method of obtaining a force between metal and polymer and intimate contact therebetween, allowing such non-stick polymers as Teflon to be used. In the past, thermal expansion of dissimilar materials joined at reduced temperature degraded the intimacy of contact An example follows showing, first how the equilibrium lengths of Teflon and stainless steel change when the temperature changes from the solidification point to room temperature. Second, the resulting strain on the Teflon is calculated as a result of the teflon being restricted from fully shrinking because it is forced to retain the length of the stainless steel. Then, using the Young's modulus of Teflon, the stress in the Teflon is calculated, and this is compared with the yield stress of Teflon, showing that the yield stress is not exceeded. Finally, following the model presented in the textbook, *Elements of Strength of Materials*, 5th Ed. by Timoshenko and Young, Van Nostrand Publisher, 1968, assuming a typical radius of curvature $R_c$ of 12 inches and a Teflon thickness $\delta$ of 40 mils, the resulting tension, or radial load pushing each square inch of the Teflon against the stainless steel is calculated.

The coefficients of thermal exansion (CTEs) of Teflon (as a function of temperature) and stainless steel are given in Table 1. Also given is Young's modulus, also known as the modulus of elasticity, and the yield strength of Teflon.

TABLE 1

| Material Properties | | | | |
|---|---|---|---|---|
| Material | Temperature (° F.) | CTE (in/in) | Young's Modulus | Yield strength |
| Teflon | 70°–212° | $6.7 \times 10^{-5}$ | $5.8 \times 10^{4}$ psi | 4300 psi |
| | 212°–300° | $9.4 \times 10^{-5}$ | | |
| | 300°—408° | $11.1 \times 10^{-5}$ | | |
| Stainless steel | all temperatures | $0.89 \times 10^{-5}$ | | |

The length of a polymer cooling by an amount $\Delta T$ from an initial solidification temperature where it has an equilibrium length $L_s$ of to an operational temperature, where it has an equilibrium length $L_{eq}$, varies with temperature as $L_{eq}=L_s(1+\alpha\Delta T)$, where $\alpha$ is the CTE of the polymer.

Assuming the polymer is Teflon and the substrate is stainless steel, and assuming both materials have a length of 1 inch at the solidification temperature, 590° F., one can use this equation to calculate from the above CTEs that the equilibrium length of the Teflon at 70° F. would be 0.950 inches while the equilibrium length of the stainless steel at 70° F. would be 0.995 inches. However, because the polymer and substrate are linked together after solidification, the actual length of the Teflon is forced to equal the actual length of the stainless steel, which is about equal to the equilibrium length of the stainless steel. The strain on the Teflon is the difference between the equilibrium and actual length divided by the actual length, or 0.0477 in/in. The stress $\sigma$ is this strain times Young's modulus, given in Table 1, which equals 2,768 psi. This is only 64% of the 4300 psi yield strength of Teflon, and thus, the Teflon does not yield, and tension between Teflon polymer 28 and the stainless steel substrate 24 is maintained.

It is worth noting that, in the above calculation, the strain and the stress $\sigma$ in the polymer film is independent of design parameters, such as thickness $\delta$ of film 28 and radius of curvature $R_c$ of convex surface 26 of substrate 24. The stress $\sigma$ in Teflon polymer film 28 depends only on the difference between the solidification and process temperatures and on the coefficients of thermal expansion of the two materials. Thus, such a structure is applicable to a wide range of designs without fear of failure in polymer film 28. Of course, the magnitude of the tension or radial loading force $\sigma_r$ holding polymer film 28 to convex surface 26 of substrate 24 does depend on these design choices, as shown below.

The tension, or radial load per unit area, $\sigma_r$ is calculated using a formula derived from one in Timoshenko and Young, $\sigma_r=\sigma\delta/R_c$. The hoop stress $\sigma$ of 2,768 psi was calculated above, the film thickness $\delta$ is assumed to be 0.04 in, and the radius of curvature $R_c$ is assumed to be 12 in. Thus, the inward loading per unit area is 9.23 psi at a process temperature of 70° F. By a similar calculation, the inward loading per unit area is 7.47 psi at a process temperature of 212° F.

A significant radial loading force $\sigma_r$ pushing each square inch of thin polymer film 28 into intimate contact with substrate 22 is thus achieved in this embodiment of the invention at typical ultrasonic processing temperatures relying exclusively on the thermal expansion differential between the materials. Of course, a desired radial load $\sigma_r$ can be achieved by modulating the thickness of the film or the radius of curvature. For example, transducers mounted on or in substrates having a smaller radius of curvature would have increased radial load $\sigma_r$. Similarly, radial load $\sigma_r$ increases with thickness, $\delta$, of the polymer film 28. By virtue of the fact that the hoop stress $\sigma$ within polymer film 28 is independent of design parameters, depending only on the magnitudes of the expansion coefficients and temperature differences, it is possible to make changes in those design parameters without fear of failure in polymer film 28.

Figure 2C:
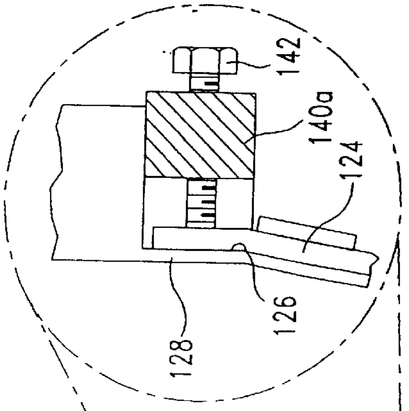
FIGS. 2a,2c are a side cross sectional view of an ultrasonic process vessel having a thin wall region forced against a convex substrate with ultrasonic transducers mounted thereon, the force provided by clamps.
Figure 2A:
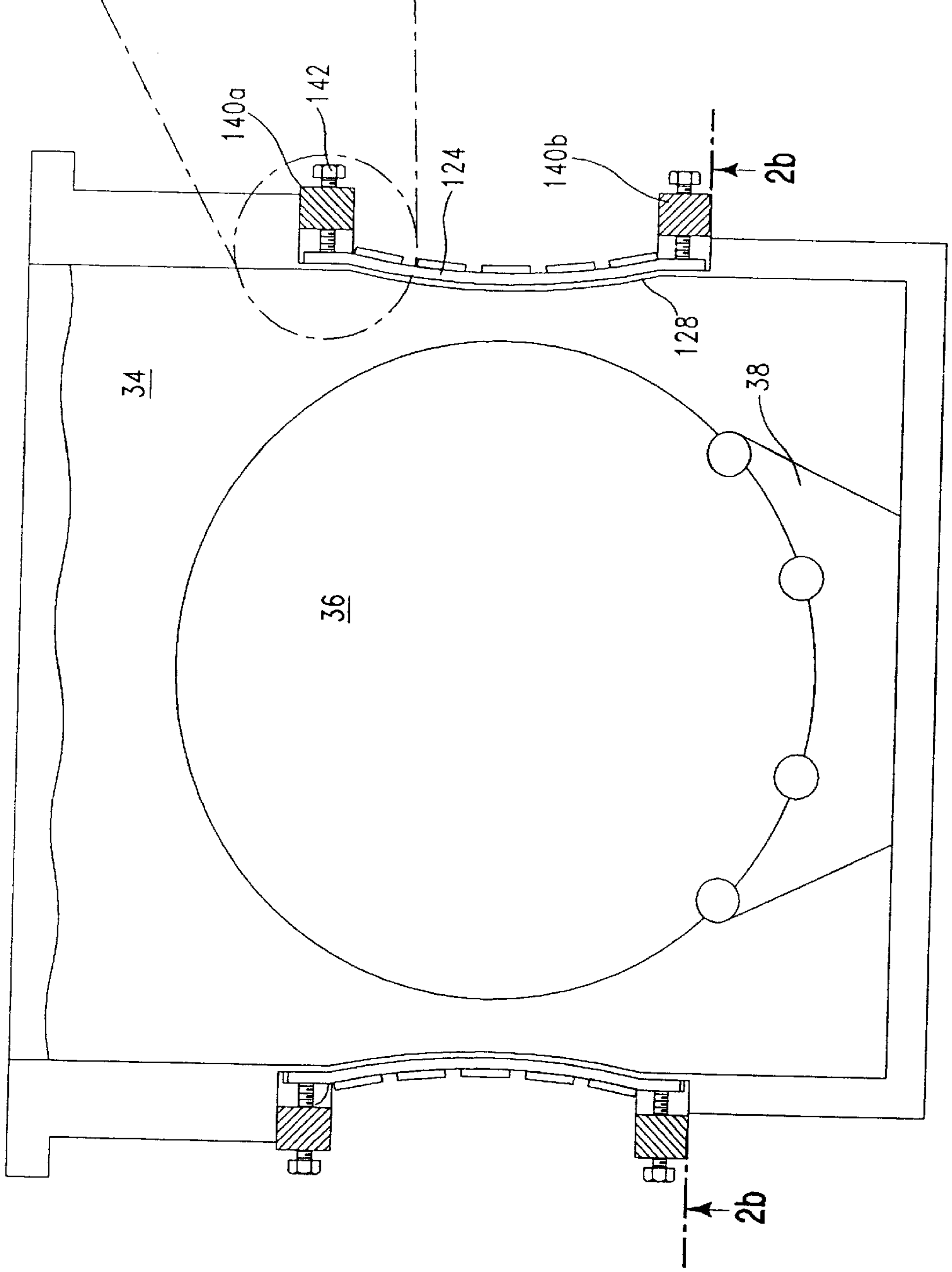
Figure 2B:
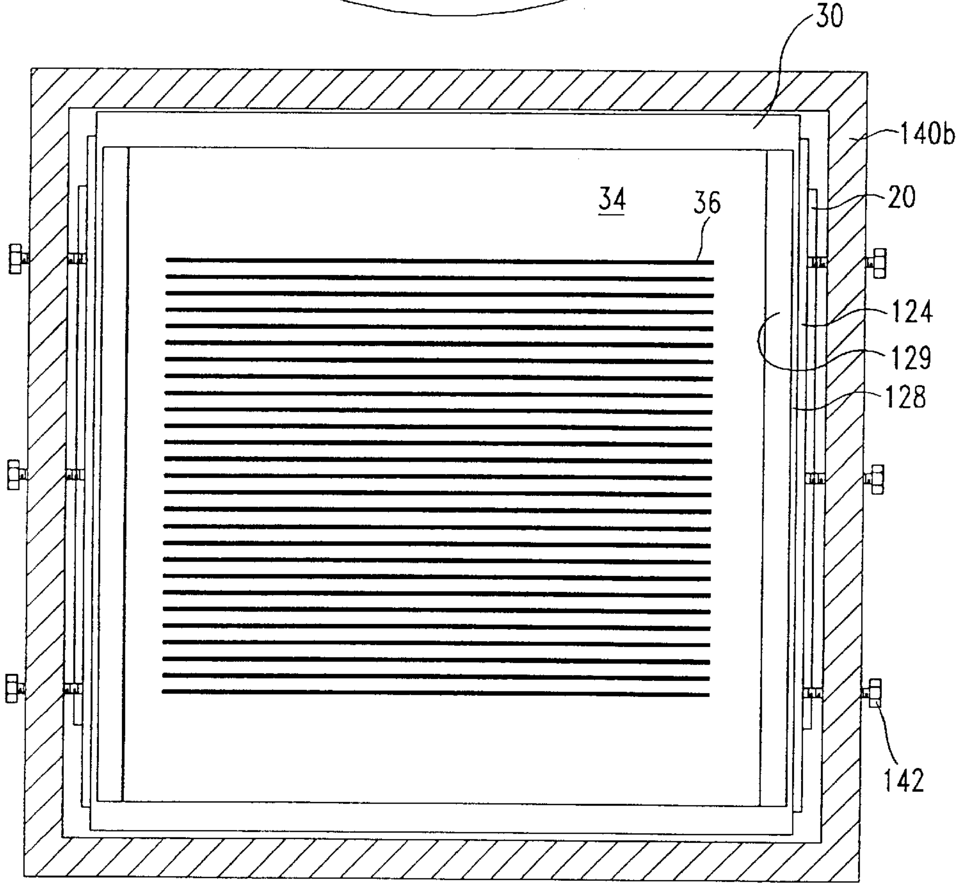
FIG. 2b is an upward looking cross sectional view of the ultrasonic process vessel of FIG. 2a showing a bar ringing the process vessel.

Alternatively, intimate contact can be achieved by machining a region of the vessel sidewall until a thin, flat, membrane of polymer 128 remains, as shown in FIGS. 2*a*,2*b* and 2*c*. Convex metal substrate 124 is then inserted over thined polymer membrane 128. Then a mechanical force is applied to stretch thinned polymer membrane 128 over convex metal substrate 124. The mechanical force is applied by frames 140*a* and 140*b* attached to vessel 30 tank by members 142 that push convex surface 126 of substrate 124 against thinned polymer membrane 128, stretching the polymer over convex surface 126, forming inner convex surface 129 of polymer membrane 128 visible in FIG. 2*b*. The mechanical stretching must be sufficient to ensure that thinned polymer membrane 128 remains in intimate contact with convex surface 126 at the highest temperature that bath 34 or substrate 124 will experience during operation.

Typically, polymers have a low level of energy transmitivity, but transmission losses in polymer film 28 are minimized in the present invention because polymer film 28 is thin. For a polymer such as teflon, the thickness of polymer film 28 is preferably in the range from about 14 mils to about 125 mils, the lower limit being set to avoid leakage through the film, the upper limit set by the flexibility of the polymer. Advantageously, polymer film 28 can be thin because substrate 22 provides mechanical support in the region of thin polymer film 28.

For the most efficient sonic transmission, reflective losses can also minimized by providing polymer film 28 with a thickness to provide reflections by surfaces 22 and 26 that are out of phase.

The present invention is applicable to a variety of devices, such as energy sources and sensors. Energy sources include sonic transducers, heaters, and light emitters. Sensors include those for temperature, pressure, flow, sound, electromagnetic field, and light. The improved coupling and efficient transfer of energy provided by the present invention have significant advantages, including reducing the temperature of the energy source, increasing system reliability, and reducing the cost of processing. For ultrasonic and megasonic semiconductor wafer cleaners, the invention provides enhanced cleaning and chemical processing. It permits operating chemical baths with a reduced concentration of chemicals and extends bath life. Likewise, the improved coupling increases the sensitivity of sensors and increases their operational lifetime.

Figure 3:
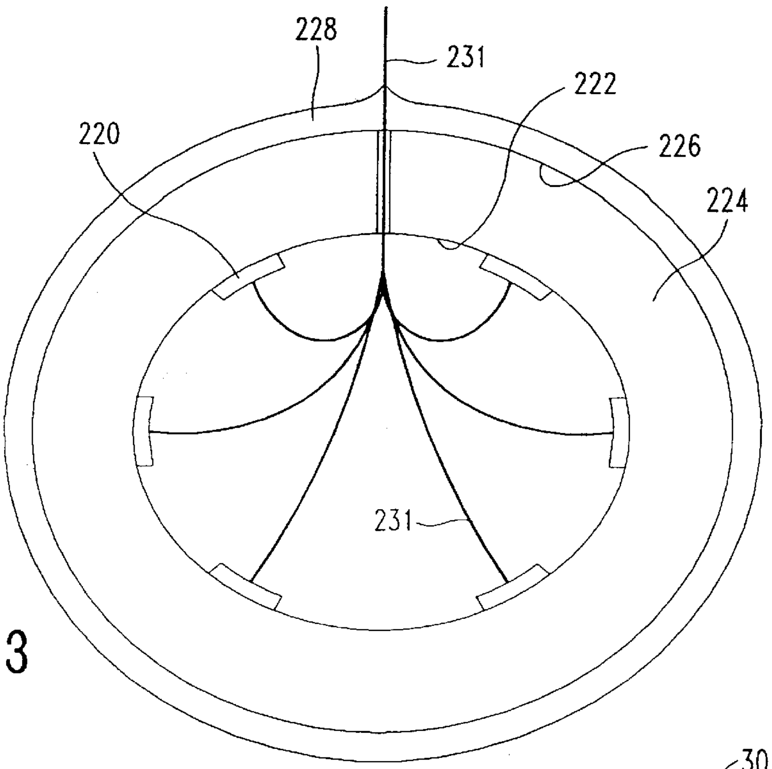
FIG. 3 is a cross sectional view of a bath insert embodiment of the present invention.

While the present invention is well suited for walls of process vessels, such as ultrasonic cleaning vessels, the invention is also applicable for coating transducers for insertion into a vessel or chamber having a reactive environment. In one embodiment, shown in FIG. 3, energy sources or sensors 220 are connected to inside surface 222 of substrate 224 that is a hollow shell having convex outer surface 226, such as a ball or cylinder. Stretched protective polymer film 228 is formed on convex outer surface 226 of substrate 224 by applying the liquid polymer to the hollow shell, either in a mold as described hereinabove, or free-standing. As described hereinabove, differential thermal contraction between substrate shell 224 and polymer coating 228 during cooling from the solidification point of polymer 228 provides a high level of inward radial loading at temperatures that are below the solidification point. Thus, an air gap between polymer 228 and outer surface 226 of substrate 224 is prevented. Energy sources or sensors 220 may be accompanied by power supplies or transmitters within substrate 224 or they may be externally connected through wires 231.

While several embodiments of the invention, together with modifications thereof, have been described in detail herein and illustrated in the accompanying drawings, it will be evident that various further modifications are possible without departing from the scope of the invention. For example, a wide range of inert polymeric materials can be used for vessel walls or coatings and a wide range of energy transmitting materials can be used for substrates. Nothing in the above specification is intended to limit the invention more narrowly than the appended claims. The examples given are intended only to be illustrative rather than exclusive.

What is claimed is:

1. A method of forming an intimate bond between a polymer tank wall and an external ultrasonic transducer for efficient ultrasonic transmission into said tank, the method in any order comprising the steps of:

(a) providing a tank having a polymer wall, said wall having an interior surface and an exterior surface;

(b) mounting a substrate having a convex surface facing a portion of said wall on said exterior surface;

(c) providing said interior surface at said portion with a convex surface;

(d) providing a tensile stress between said polymer and said substrate to mechanically bond said polymer to said substrate; and (e) mounting an untrasonic transducer on the surface opposite to the convex surface of said substrate for coupling ultrasound through said polymer into said tank.

2. A method as recited in claim 1, said substrate being a curved metal plate.

3. A method as recited in claim 1, said portion being a thin film.

4. A method as recited in claim 3, said polymer further comprising thick regions on opposite edges of said thin film, said thin film being seamlessly connected to said thick regions.

5. A method as recited in claim 1, said tensile stress resulting from a thermal expansion coefficient difference between said substrate and said polymer.

6. A method as recited in claim 1, said polymer being a fluoropolymer or a polyolefin.

7. A method as recited in claim 1, said polymer having a thickness in the range of 14 mils to 125 mils.

8. A method as recited in claim 1, said substrate of said step (b) having a first coefficient of thermal expansion, said providing step (a) comprising the step of applying said polymer as a liquid on said convex surface of said substrate, said polymer as a solid having a second coefficient of thermal expansion, said second coefficient being higher than said first coefficient, said providing step (d) comprising the step of cooling to solidify said liquid polymer into a solid at a solidification temperature, and further cooling to provide a temperature difference from said solidification temperature, wherein said tensile stress mechanical bond is formed between said polymer and said convex surface, said stress substantially proportional to said temperature difference.

* * * * *